R. KIFT.
FLOWER OR PLANT HOLDER.
APPLICATION FILED OCT. 20, 1908.

926,574. Patented June 29, 1909.

Witnesses:
Wm. A. Burrowes
Walter F. Pullinger

Inventor:-
Robert Kift.
by his Attorneys:-
Howson & Howson

UNITED STATES PATENT OFFICE.

ROBERT KIFT, OF PHILADELPHIA, PENNSYLVANIA.

FLOWER OR PLANT HOLDER.

No. 926,574.

Specification of Letters Patent.  Patented June 29, 1909.

Application filed October 20, 1908. Serial No. 458,641.

*To all whom it may concern:*

Be it known that I, ROBERT KIFT, a citizen of the United States, residing in Philadelphia, Pennsylvania, have invented certain Improvements in Flower or Plant Holders, of which the following is a specification.

My invention relates to holders or receptacles for growing plants; and the object of my invention is to provide a structure, pleasing in design and shape, in which the flower or plant is bedded in a suitable pot or similar receptacle and inclosed in a glass globe through which it may be viewed.

My invention is particularly applicable for ferns and other plants of a similar nature for table decoration, although as will be understood, its use is not limited to such plants.

Figure 1:
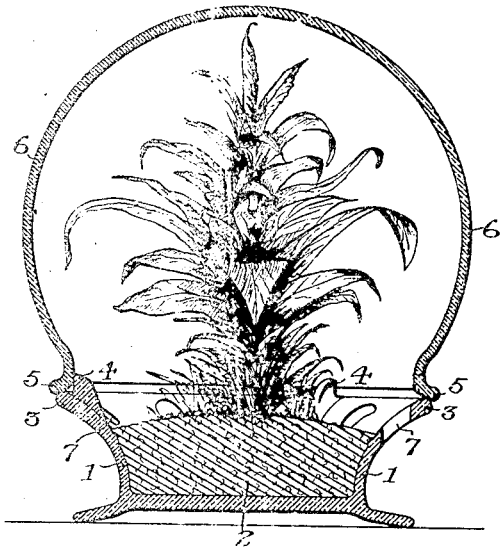

My invention is fully shown in the accompanying drawings, in which:

Figure 1, is a sectional elevation of one form of structure embodying my invention, and Figs. 2, 3, 4 and 5, are views illustrating modified forms of my improved structure.

In the drawings herewith, 1 represents a suitable dish or receptacle of glass, porcelain, pottery, or other suitable material, adapted to receive a body of moss, earth or other material in which growing plants may be maintained; such material being indicated at 2. The dish 1 is provided with a verge 3 having projections 4 forming a seat to receive the rim 5 of a globe or cover 6, of glass or other suitable transparent material.

In the form of structure illustrated in Fig. 1, a series of apertures 7 for the passage of air to maintain plant life are provided, inside the verge, and the soil or moss is disposed within the receptacle below these apertures. Under ordinary circumstances, it is only necessary to wet the earth or moss when the plant is originally placed therein and no further moisture need be added.

Figure 2:
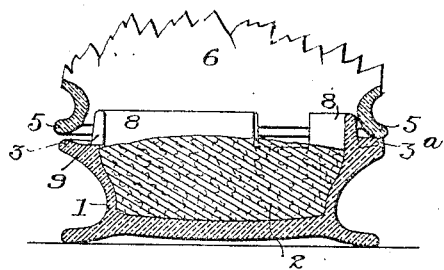

In the structure shown in Fig. 2, the pot or earth receptacle is of slightly different contour, and an inner rim or shoulder 8, having cut away portions 9 for the admission of air is provided. In addition the verge 3 has projections 3ª to raise the rim of the globe.

Figure 3:
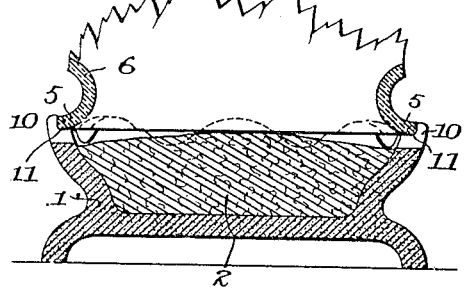

In the form of structure shown in Fig. 3, the dish or receptacle for earth or moss in which the plants grow is provided with a scalloped edge or top, the projections 10 of which have seats 11 on their inner side to engage the rim 5 of the globe. The low portions of the scallops form apertures for the passage of air. This form of the structure is preferably made of earthenware.

Figure 4:
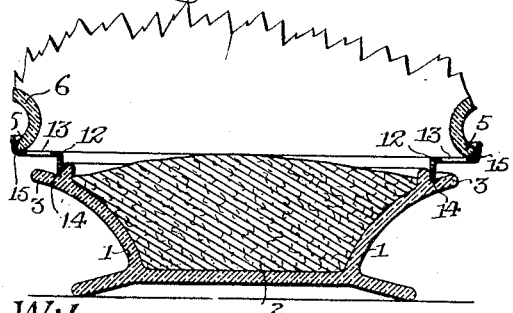

In lieu of having the shoulder or seat to receive the rim of the globe formed directly on the dish or receptacle, I may provide a dish such as shown in Fig. 4, with a separate rim 12, having apertures 13 for the passage of air, such rim being of metal or other suitable material and having a portion 14 to engage the dish and a seat 15 for the rim 5 of the globe.

Figure 5:
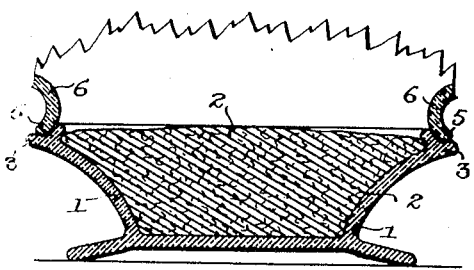

In the form of structure shown in Fig. 5, no provision is made for the admission of air. This form of structure is available for use with wintergreen and other foliage plants having colored berries, particularly the partridge berries.

I claim:

1. A plant holder comprising a dish to receive a body of earth or moss and plants and having a marginal seat with ventilating apertures, and a glass globe inclosing the plants within said dish and engaging said seat.

2. A plant holder comprising a dish arranged to receive a plant or plants and constructed to afford ventilation, said dish having a seat, in combination with a glass globe inclosing the plant or plants and resting upon said seat.

3. A plant holder comprising a dish or receptacle arranged to receive a plant or plants, having a seat and ventilating apertures disposed in its wall inside said seat, in combination with a transparent cover inclosing the plant or plants and resting upon said seat.

4. A plant holder comprising a dish having an apertured verge, said verge having an annular seat, and a glass globe inclosing the plants within said dish and resting upon the seat of the verge.

5. A plant holder comprising a dish arranged to receive a plant or plants and constructed to afford ventilation, in combination with a separable annular member forming a seat, and a glass globe inclosing the plant or plants and resting upon said seat.

In testimony whereof, I have signed my name to this specification, in the presence of two subscribing witnesses.

ROBERT KIFT.

Witnesses:
 WM. E. SHUPE,
 WM. A. BARR.